United States Patent [19]

Gargos

[11] Patent Number: 4,686,377
[45] Date of Patent: Aug. 11, 1987

[54] SYSTEM FOR GENERATING POWER FROM WAVES

[76] Inventor: Gary Gargos, 355 W. Windsor Rd., Glendale, Calif. 91204

[21] Appl. No.: 849,417

[22] Filed: Apr. 8, 1986

Related U.S. Application Data

[63] Continuation-in-part of Ser. No. 818,091, Jan. 10, 1986.

[51] Int. Cl.⁴ ............................................. F03B 13/12
[52] U.S. Cl. ...................................... 290/53; 290/42; 417/332
[58] Field of Search .................................. 290/42, 53; 417/330–332, 338–341

[56] References Cited

U.S. PATENT DOCUMENTS

| | | | |
|---|---|---|---|
| 1,078,323 | 11/1913 | Trull | 417/332 |
| 3,603,804 | 9/1971 | Casey | 290/53 X |
| 4,210,821 | 7/1980 | Cockerell | 417/332 X |
| 4,281,257 | 7/1981 | Testa et al. | 290/53 X |
| 4,289,455 | 9/1981 | Comyns-Carr et al. | 417/332 |

Primary Examiner—William M. Shoop, Jr.
Assistant Examiner—W. E. Duncanson, Jr.
Attorney, Agent, or Firm—Lyon & Lyon

[57] ABSTRACT

A float mechanism for generating energy from waves. Floats are coupled together such that they can pivot about a horizontal axis relative to one another. Hydraulic cylinders on either side of the attachment points compress and extend with the wave motion. Check valves control flow to and from the cylinders. The floats are pivotally tied to a floating structure such that they can pivot about the structure on the surface of the water as may be required for maximum efficiency. Water compressed from the cylinders feeds a turbine which in turn feeds a generator for the generation of electrical power. In the second embodiment, floats are coupled together by means of compound bell cranks and hydraulic cylinders are coupled between alternate bell cranks at the lateral arms thereof.

5 Claims, 7 Drawing Figures

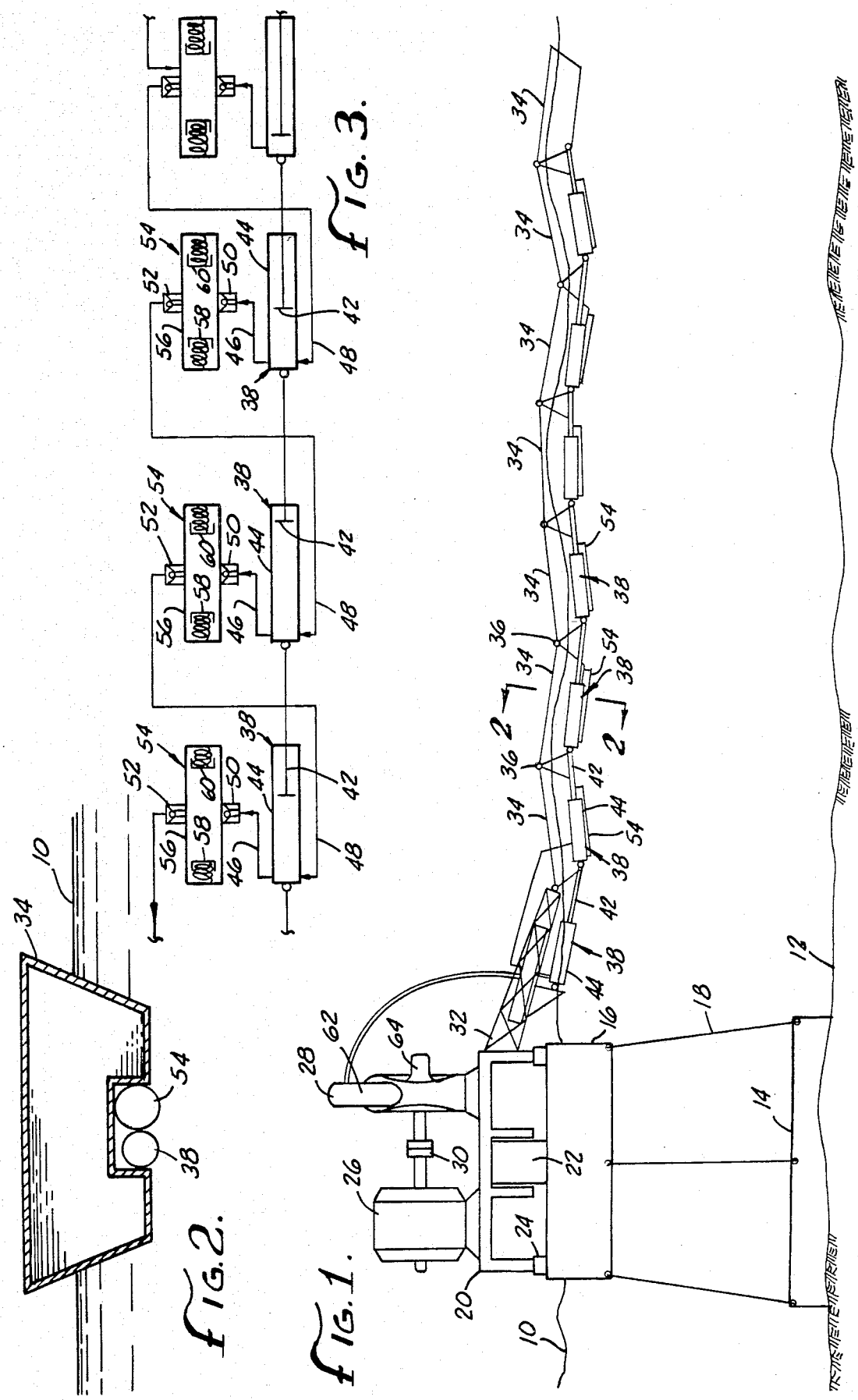

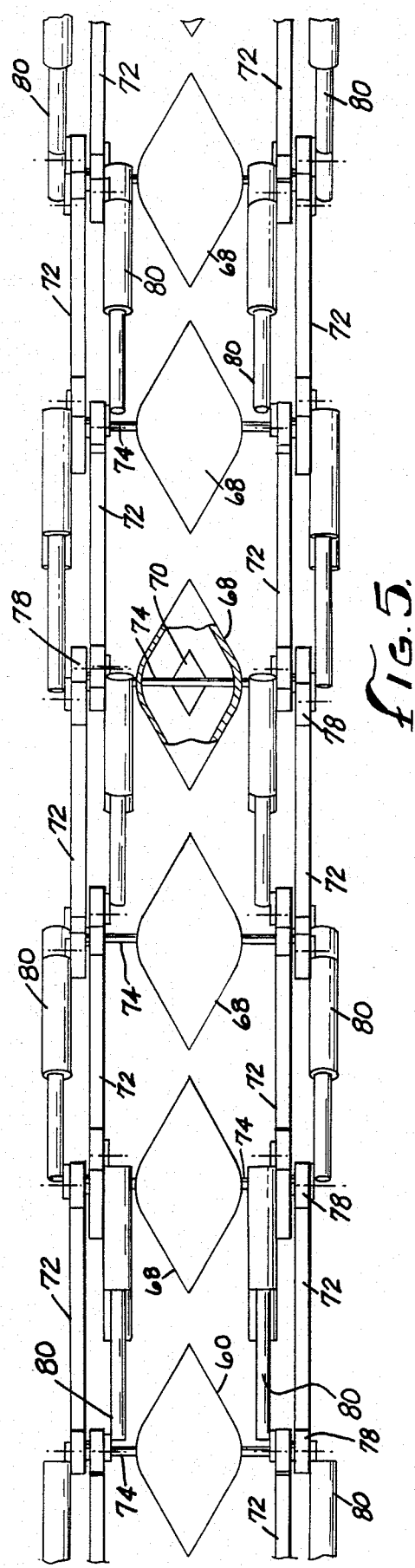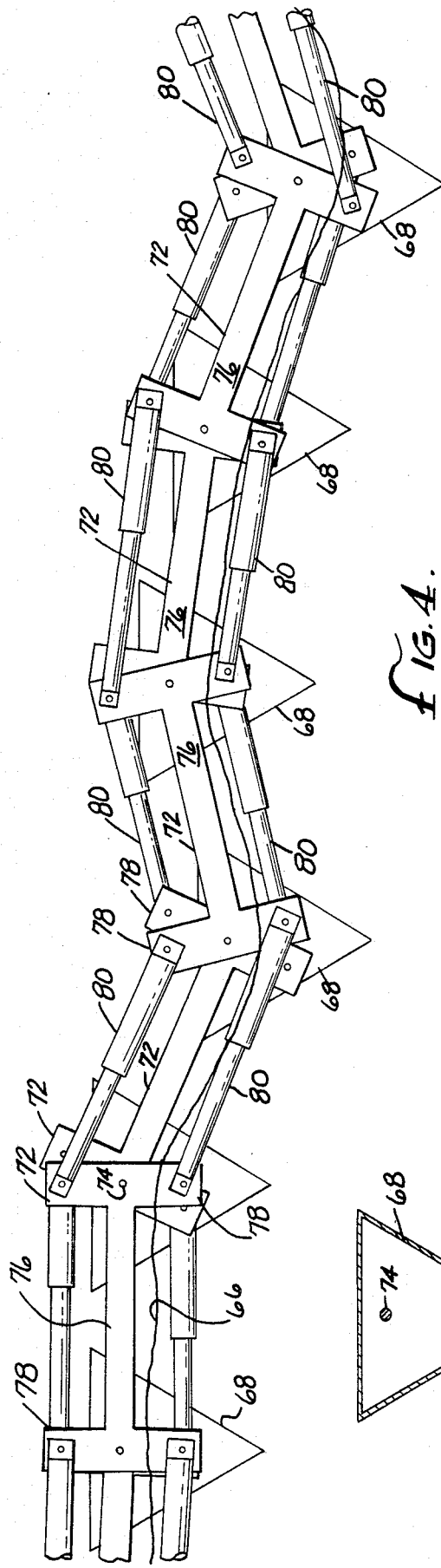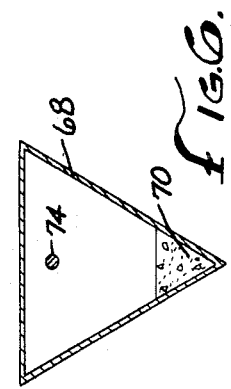

SYSTEM FOR GENERATING POWER FROM WAVES

CROSS-REFERENCE TO RELATED APPLICATION

This application is a continuation-in-part of U.S. patent application Ser. No. 818,091, filed Jan. 10, 1986, and entitled POWER PLANT DRIVEN BY WAVES.

BACKGROUND OF THE INVENTION

The field of the present invention is means for generating power from waves.

Increasingly, energy in various forms is being employed as potential sources for the generation of useful power. Among these sources is wave energy on large bodies of water. An unlimited supply of energy is available from this source if it can be economically harnessed. One such mechanism useful for boat propulsion employing the engery in waves is illustrated in my U.S. Pat. No. 4,481,002, BOAT POWERED BY SEA WAVES, the disclosure of which is incorporated herein by reference.

SUMMARY OF THE INVENTION

The present invention is directed to a power generation system using waves on a body of water. A series of floats are coupled together and employ bell cranks associated with hydraulic cylinders between adjacent floats. The floats experience relative motion due to wave action and the hydraulic cylinders are expanded and contracted thereby. The cylinder actuation then may drive a turbine which in turn powers a generator or may drive a propulsion system if the floats are part of a multihull boat.

Accordingly, it is an object of the present invention to provide an improved power generation system using waves. Other and further objects and advantages will appear hereinafter.

BRIEF DESCRIPTION OF THE DRAWINGS

FIG. 1 is a schematic illustration of the power generation system of the present invention.

FIG. 2 is a cross-sectional view taken along line 2—2 of FIG. 1.

FIG. 3 is a schematic illustration of a hydraulic system of the present invention.

FIG. 4 is a side view of a second embodiment of the present invention.

FIG. 5 is a plan view of the second embodiment of the present invention.

FIG. 6 is a cross-sectional view of a float of the second embodiment.

FIG. 7 is a schematic illustration of a hydraulic system of the present invention.

DETAILED DESCRIPTION OF THE PREFERRED EMBODIMENT

Turning in detail to the drawings, a power generation system is illustrated associated with a body of water. The body of water 10 having a bottom 12 supports an anchoring structure 14. The anchoring structure 14 may take any convenient form capable of holding the mechanism in place. A floating structure 16 is maintained in a slightly submerged state with anchoring chains 18 extending from the anchor structure 14 under tension. Thus, a stable structure is established which does not significantly move in the wave action of the body of water.

Positioned atop the floating structure 16 is a platform 20. The floating structure 16 includes a pivot member 22 about which the platform 20 is pivotally supported. Rollers 24 or other low friction members may be employed to facilitate pivotal motion of the platform 20 relative to the floating structure 16. Supported atop the platform 20 are a generator 26 and a turbine 28. The generator 26 and turbine 28 are coupled together such that the turbine 28 is capable of driving the generator 26 through a coupling mechanism 30. Suitable weather protection may be afforded by covering the generator 26 and turbine 28 on the platform 20 where desired.

Coupled to the platform 20 is a mouring structure 32. The mouring structure 32 extends downwardly to near the water line where it couples with a plurality of floats 34. Any practical number of floats 34 may be employed arranged in seriatim and coupled by means of hinges 36 to one another, end to end. The floats are to remain bouyant such that they ride on the water. Their longitudinal dimension must be such that they will preferably pitch relative to one another in the waves. The hinges 36 may be of conventional design designed for sufficient strength to maintain the floats together even in rough seas. The leading and trailing sides of the floats 34 are beveled such that they can accommodate substantial pivotal movement of one float relative to the adjacent float.

Coupled between adjacent floats 34 are hydraulic cylinders 38. It is possible to mount a plurality of such hydraulic cylinders between adjacent floats, two on each side of a pair of floats, or two cylinders capable of accommodating twice the load may be employed. In this embodiment, one cylinder is employed. The hydraulic cylinders 38 are pinned at each end to adjacent floats 34 to accommodate the relative pivotal motion between floats 34 and to shorten and lengthen as the floats are influenced by the passing waves.

The hydraulic cylinders 38 each include a piston 42 and cylinder 44. An outlet 46 receives fluid pressure from the compressing hydraulic cylinder while an intake 48 receives additional charge during expansion of the hydraulic cylinder 38. A check valve 50 is interposed in the outlet 46 to allow one way flow away from the cylinder. A check valve 52 is also employed with the intake 48 to allow one way flow to the hydraulic cylinder during charging. The intake to the outermost hydraulic cylinder may be from the body of water. This intake opening is preferably well below the water line to insure that air is not sucked up into the cylinder during operation. A variable volume closed reservoir 54 is associated with each outlet 46. Each reservoir generally includes a cylinder 56 having spring loaded pistons 58 and 60. The reservoirs 54 receive water from the preceeding outlet 46 through the check valve 50. Pressurized water is supply water to the adjacent intake 48 through the check valve 52. In effect, the hydraulic cylinders 38 and variable volume reservoirs 54 are arranged in series alternating between the two devices to the turbine 28 at an intake 62. Once the pressure flow is employed by the turbine, the water is exhausted through the outlet 64 to return to the body of water.

To provide additional input, a last cylinder 38 may be coupled to the first float 34 and to the adjacent platform 20 at the mouring structure 32. This arrangement is best illustrated in FIG. 1.

Turning to the embodiment illustrated in FIGS. 4, 5 and 6, a body of water 66 supports a plurality of floatable vessels 68. The vessels 68 are illustrated to be triangular in side view and constructed with a prow at each end as can be seen in plan. This arrangement reduces the amount of drag on the chain of floats by passing waves. Ballast 70 is placed at the bottom of the floatable vessel 68 to retain the vessels in an upright position.

A series of links are arranged to either side of the line of floatable vessels 68 to both retain the vessels together and establish lever mechanisms for the actuation of hydraulic cylinders. Extending between each adjacent floatable vessel 68 is a compound bell crank 72. Each bell crank 72 is pinned to two floatable vessels 68 by means of pivot shafts 74. Each of the compound bell cranks 72 is free to pivot relative to the adjacent compound bell crank 72 and relative to the floatable vessel 68 to which it is tied by means of the pivot shaft 74. Each compound ball crank 72 includes a central arm 76. Each of the central arms 76 is pinned at its ends to the pivot shafts 74. Extending outwardly in opposite directions from each end of the central arms 76 are lateral arms 78. The lateral arms 78 thus act as bell cranks with the center arm 76 about the pivot shafts 74. As can be seen from the plan view illustrated in FIG. 5, the compound bell cranks 76 pinned to the pivot shafts 74 are arranged in a symmetrical manner to either side of the floatable vessels 68.

Coupled between the ends of the lateral arms 78 on alternate compound bell cranks 72 are hydraulic cylinders 80. As can be seen from FIG. 4, each set of hydraulic cylinders 80 between any two adjacent floatable vessels 68 are not attached to the compound bell crank 72 which extends between the same two floatable vessels 68. Instead, the hydraulic cylinders 80 extend between alternate bell cranks extending in each direction away from the pair of floatable vessels 68. By having the lateral arms 78 of the compound bell crank 78 extend in opposite directions, two cylinders 80 can be positioned between any two floatable vessels 68 on one side thereof. The upper cylinder 80 is pinned to the upper extending lateral arm 78 while the lower cylinder 80 is pinned to the lower extending lateral arms 78 from either side of the pivot shaft 74.

The train illustrated in either embodiment can be employed as either a stationary power station as more specifically illustrated in FIG. 1 or as an articulated multihull boat as illustrated in my U.S. Pat. No. 4,481,002 referred to above and incorporated herein by reference.

An alternate hydraulic mechanism is schematically illustrated in FIG. 7. The hydraulic cylinders 80 are shown to be coupled with hydraulic lines 82. A check valve 84 prevents reverse flow through the hydraulic lines 82. Inlet lines 86 feed the hydraulic cylinders 80 and also have check valves 88 to prevent reverse flow through the inlet lines 86. In this arrangement, the hydraulic lines are coupled in parallel between the hydraulic cylinders 80 and an output line 90 which may be directed to a turbine or other means for generating the requisite form of power.

Thus, a power generation system using the energy in waves within a body of water is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A system for generating power from waves in a body of water, comprising
    a plurality of floatable vessels;
    a plurality of compound bell cranks having a central arm pinned at each end to adjacent said vessels and lateral arms extending outwardly in two opposed directions from each end of said central arm; and
    hydraulic cylinders pinned to alternate said compound bell cranks at the ends of said lateral arms.

2. The system of claim 1 wherein each said vessel includes a prow.

3. The system of claim 1 wherein there are compound bell cranks pinned to each side of said plurality of vessels.

4. The system of claim 1 further comprising hydraulic lines and an output line, said hydraulic lines being coupled in parallel from said hydraulic cylinders to said output line.

5. A system for generating power from waves in a body of water, comprising
    at least four floatable vessels including a first said vessel, a second said vessel, a third said vessel and a fourth said vessel arranged in seriatim;
    a first bell crank having a first central arm pinned at a first end to said first floatable vessel and pinned at a second end to said second floatable vessel and first lateral arms extending outwardly in two opposed directions from said second end of said first central arm;
    a second bell crank having a second central arm pinned at a first end to said fourth floatable vessel and pinned at a second end to said third floatable vessel and second lateral arms extending outwardly in two opposed directions from said second end of said second central arm;
    a third central arm pinned at a first end to said second floatable vessel and pinned at a second end to said third floatable vessel; and
    a plurality of hydraulic cylinders each pinned at a first end to said first bell crank at the ends of said first lateral arms and pinned at a second end to said second bell crank at the ends of said second lateral arms.

* * * * *